Patented May 17, 1932

1,858,632

UNITED STATES PATENT OFFICE

KARL FRITZ MAENNCHEN AND FRANZ HÜMMERICH, OF HOCHST-ON-THE-MAIN, GERMANY, ASSIGNORS TO GENERAL ANILINE WORKS, INC., OF NEW YORK, N. Y., A CORPORATION OF DELAWARE

STABLE PREPARATIONS OF VAT DYESTUFFS AND PROCESS FOR MAKING SAME

No Drawing. Application filed October 1, 1926, Serial No. 139,012, and in Germany October 17, 1925.

Our present invention relates to the production of stable preparations of vat-dyestuffs.

Vat-dyestuffs to be used for dyeing wool, are mostly put on the market in the form of the alkali metal-salts of their leuco compounds, for instance in the form of a liquid or solid vat, whereby the dyer is enabled to carry out the dyeing process without having to use an alkali, which fact is of the utmost importance because, when wrong doses of the alkali lye are used the wool-fibre will be injured. There have been produced, also solid preparations of vat dyestuffs by mixing the dyestuffs with an alkali and hydrosulfite and adding then a dispersing agent.

Now we have found that preparations of vat dyestuffs of very good stability, containing the requisite quantity of alkali and yielding with water on addition of a reducing agent vats ready for use are obtained by adding to the dry dyestuff-powders, instead of an alkali, the equivalent quantity of a dry pulverized alkali starch-preparation. Thereby the addition of a special dispersing-agent is rendered unnecessary. The said alkali starch-preparations are particularly suitable for the above mentioned purpose because, unlike pulverized caustic alkali, they are very little hygroscopic and are only slowly and to a small extent decomposed by the carbonic acid contained in the air. Similar results may be obtained by using a mixture of caustic alkali and starch instead of the ready-made alkali starch-preparations. In this case the moisture absorbed by the caustic alkali from the surrounding air is rendered innocuous by the formation of the compound of caustic alkali and starch which takes place immediately wherever moisture arises.

By these preparations there are offered to the dyer vat dyestuffs combined with just the quantity of alkali required for the vatting; in order to obtain the desired vats the dyer has only to mix the dyestuff-powder with a wetting or dispersing agent and water and to add the required quantity of hydrosulfite.

The hydrosulfite and the wetting or dispersing agents, for instance a salt of a sulfonic acid of unsaturated fatty acid, ligninsulfonates or a substance of similar action, may also be added already when preparing the above described dyestuff-powder preparations without impairing their stability. It is advantageous to add the wetting or dispersing agents when drying the dyestuff paste. The preparations just described, which contain already all ingredients required for the vatting, are readily soluble in moderately heated water and eminently stable and, when dissolved in water, they yield vats which are ready for use without any further addition.

The alkali starch-preparation to be used according to the following examples may be made as follows:

3 parts by weight of starch are mixed and stirred at ordinary temperature with 4.5 parts by weight of caustic soda solution of 40° Bé.; at first there is obtained a colloidal solution which, after about 15 minutes, solidifies into a white powdered mass. This powder is dried in a vacuum at 70–80° C. and ground to a fine dust. A titrometric test shows that the powder contains 39% of NaOH. The composition of the alkali starches may largely vary; it is, however, advantageous to employ such preparations as contain one molecule of starch to 1.5–5 molecules of caustic soda.

Examples (1) 50 parts by weight of di-(p-chloranilido)-benzoquinone in the form of a dry powder are intimately mixed with 95 parts by weight of the dry, ground alkali-starch of the composition indicated above.—the preparation thus obtained gives a clear vat by covering it with a wetting agent, for instance with so-called "monopol soap" (sodium sulforicinolate) and warm water and adding 60 parts by weight of hydrosulfite.

(2) An indigo-paste, containing 50 parts by weight of indigo, is evaporated to dryness with a solution of 2.5 parts of sodium ligninsulfonate. The resulting mass is mixed and ground with 69 parts of the alkali starch and 80 parts by weight of hydrosulfite. The preparation thus obtained on being covered with warm water yields a vat ready for use.

(3) To 150 parts by weight of 30% paste of the brown vat dyestuff, obtainable by the process described in U. S. Patent No. 1,128,368 of February 16, 1915, are added 12 parts by weight of "monopol soap", whereupon the paste is evaporated to dryness. The dry mass is intimately mixed and ground with 80 parts by weight of alkali starch and 70 parts by weight of hydrosulfite. On covering the preparation thus obtained with warm water, a vat is obtained which is quite ready for use.

(4) 60 parts by weight of thioindigo-red powder, containing 10% of "monopol soap" are mixed and ground with 95 parts by weight of the alkali starch preparation. The dyestuff preparation thus obtained gives a clear vat on covering it with warm water and adding 80 parts by weight of hydrosulfite.

(5) 150 parts by weight of a 30% paste of the brown vat dyestuff, obtainable by the process described in U. S. Patent No. 1,128,368 are evaporated to dryness with 10 parts by weight of "monopol soap" and the resulting mass is then mixed and ground with 50 parts by weight of dry starch, 33 parts by weight of caustic soda and 70 parts by weight of hydrosulfite. On addition of warm water, the preparation thus obtained yields a vat which is quite ready for use.

The quantity of caustic soda used in the foregoing example may be wholly or partly replaced by another alkali, for instance sodium carbonate.

All the preparations made by the process set forth in the foregoing examples have proved to remain unaltered even when being exposed to the air for several months.

In the following claims we understand by the term "alkali" not only the caustic alkalis, but also the carbonates of the alkalis.

We claim:

1. As new products, stable vat dyestuff preparations comprising a vat dyestuff, alkali starch and hydrosulfite.

2. As new products, stable vat dyestuff preparations comprising a vat dyestuff, alkali starch, hydrosulfite and a wetting agent.

3. As new products, stable vat dyestuff preparations consisting of a vat dyestuff, alkali starch, hydrosulfite and monopol soap.

In testimony whereof, we affix our signatures.

KARL FRITZ MAENNCHEN.
FRANZ HÜMMERICH.